United States Patent
Filev et al.

(10) Patent No.: US 10,875,543 B2
(45) Date of Patent: Dec. 29, 2020

(54) CONTROLLER INPUT COMPENSATION

(71) Applicant: Ford Global Technologies, LLC, Dearborn, MI (US)

(72) Inventors: Dimitar Petrov Filev, Novi, MI (US); Yan Wang, Ann Arbor, MI (US); Steven Joseph Szwabowski, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 413 days.

(21) Appl. No.: 15/894,099

(22) Filed: Feb. 12, 2018

(65) Prior Publication Data

US 2019/0248377 A1    Aug. 15, 2019

(51) Int. Cl.
*B60W 50/06* (2006.01)
*B60W 30/18* (2012.01)
(Continued)

(52) U.S. Cl.
CPC ............ *B60W 50/06* (2013.01); *B60W 10/04* (2013.01); *B60W 10/18* (2013.01); *B60W 10/20* (2013.01);
(Continued)

(58) Field of Classification Search
CPC ......... B60W 2710/06; B60W 2710/08; B60W 2710/18; B60W 2710/20; B60W 2520/105; B60W 2555/20; B60W 2550/00; B60W 2550/10; B60W 2550/14; B60W 2550/146; B60W 2550/20; B60W 2550/22; B60W 2550/30; B60W 2550/40; B60W 2550/402; B60W 2550/406; B60W 2550/408; B60W 2510/06; B60W 2510/0638; B60W 2510/0642; B60W 2510/0652; B60W 40/00; B60W 40/10; B60W 40/105; B60W 40/109; B60W 2050/00; B60W 2050/0001; B60W 2050/0009; B60W 2050/0013; B60W 2050/04; B60W 2050/0016;
(Continued)

(56) References Cited

U.S. PATENT DOCUMENTS 7,762,360 B2    7/2010  Saposnik
7,835,832 B2 *  11/2010 Macdonald ............. G01S 19/03
                                                  701/24
(Continued)

FOREIGN PATENT DOCUMENTS

| CN | 104808487 A | 7/2015 |
| CN | 105773623 A | 7/2016 |
| EP | 2497610 B1 | 12/2012 |

*Primary Examiner* — Anthony R Jimenez
(74) *Attorney, Agent, or Firm* — Frank A. MacKenzie; Bejin Bieneman PLC

(57) ABSTRACT

A system, comprising a first computer that includes a processor and a memory. The memory stores instructions executable by the processor to input an expected control input to a second computer, and then, to determine a response resulting from the expected control input. The memory stores instructions to determine a compensated control input based on the expected control input and the response, and to input the compensated control input to the second computer to achieve the expected control input. The second computer is provided to actuate a vehicle component to achieve the expected control input.

20 Claims, 4 Drawing Sheets

(51) Int. Cl.
*B60W 10/04* (2006.01)
*B60W 10/18* (2012.01)
*B60W 10/20* (2006.01)
*B60W 50/00* (2006.01)

(52) U.S. Cl.
CPC ............ *B60W 30/18163* (2013.01); *B60W 2050/0009* (2013.01); *B60W 2520/105* (2013.01); *B60W 2555/20* (2020.02); *B60W 2710/06* (2013.01); *B60W 2710/08* (2013.01); *B60W 2710/18* (2013.01); *B60W 2710/20* (2013.01)

(58) Field of Classification Search
CPC . B60W 2050/0026; B60W 2050/0043; B60W 2050/0075; B60W 2050/0097; B60W 30/02; B60W 30/08; B60W 30/10; B60W 30/16; B60W 30/18; B60W 30/18009; B60W 30/18163; B60W 30/188; B60W 30/1882; B60W 30/192; B60W 20/00; B60W 20/11; B60W 20/12; B60W 10/04; B60W 10/06; B60W 10/08; B60W 10/10; B60W 10/18; B60W 10/20; B60W 10/22; B60W 10/24; B60W 10/30; G05D 1/027; G05D 1/0223; G05D 1/0088; G05D 1/0217; G05D 1/0248; G05D 1/0274; G05D 1/02; G05D 1/0278; G05D 1/0231; G05D 1/0253; G05D 1/0272; G05D 2201/0213; G05D 2201/0201; G01C 21/3415; G01C 21/3446; G08G 1/202; F02N 11/00; F02N 11/04; F02N 11/06; F02N 11/08; F02N 11/0818; F02N 11/0829; F02N 11/0833; F02N 11/0851; F02N 11/0859; F02N 11/087; B62D 15/025; G01S 19/43
USPC .................................................... 701/26, 36
See application file for complete search history.

(56) References Cited

U.S. PATENT DOCUMENTS 8,504,175 B2 8/2013 Pekar et al.
2017/0129538 A1 5/2017 Stefan et al.

* cited by examiner

CONTROLLER INPUT COMPENSATION

BACKGROUND

One or more computers can be programmed to control vehicle operations, e.g., as a vehicle travels on a road. For example, a computer may control vehicle operation in an autonomous mode, e.g., by controlling one or more of vehicle acceleration, braking, and steering. The vehicle computer may control a vehicle operation based on control parameter(s) such as proportional, derivative, and/or integral control parameters. Maintaining and adjusting control parameters is important to proper vehicle operation, e.g., so maneuvers can be carried out as intended, e.g., so steering can maintain a safe path during a lane change maneuver.

DETAILED DESCRIPTION

Introduction

Figure 1:
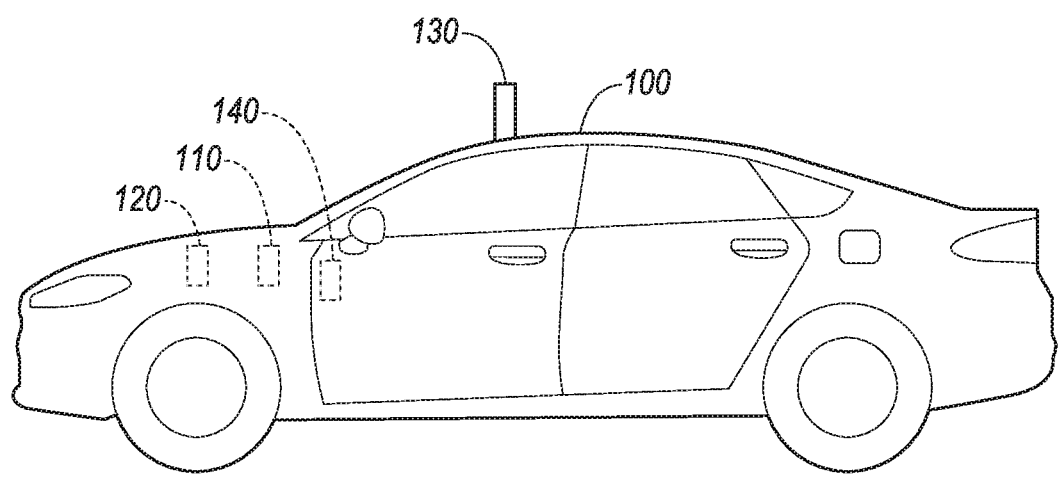
FIG. 1 is a diagram of an example vehicle.

Disclosed herein is a system including a first computer that includes a processor and a memory. The memory stores instructions executable by the processor to input an expected control input to a second computer, wherein the second computer is provided to actuate a vehicle component to achieve the expected control input, then determine a response resulting from the expected control input, determine a compensated control input based on the expected control input and the response, and input the compensated control input to the second computer to achieve the expected control input.

The expected control input may include changes of one or more physical parameters over time.

The expected control input may include at least one of a curve and a step pulse.

The expected control input may include changes of at least one of a speed, an acceleration, an angle, and a location, a temperature, and a pressure over time.

A parameter of the second computer may be non-calibratable.

The instructions may include further instructions to iteratively determine a second compensated control input based on the compensated control input and a response resulting from the compensated control input.

The response may include changes of a physical parameter based at least in part on an actuation of a vehicle component by the second computer, and the second computer may be configured to actuate the vehicle component based at least in part on the control input.

The instructions may include further instructions to determine a first set of expected operation points based on the expected control input and a predetermined sampling rate, determine a second set of response operation points based on the determined response and the predetermined sampling rate, and determine the compensated control input based on the first set of the expected operation points and the second set of response operation points.

The instructions may include further instructions to stop determining a second compensated control input upon determining that a deviation between the response and the expected control input is less than a predetermined deviation threshold.

The deviation between the response and the expected control input may further include a plurality of deviations between a first set of expected operation points and a second set of response operation points.

The predetermined deviation threshold may include at least one of a maximum overshoot threshold, a maximum undershoot threshold, and an average threshold, of the plurality of deviations.

Further disclosed herein is a method including inputting, from a first computer, an expected control input to a second computer, wherein the second computer is provided to actuate a vehicle component to achieve the expected control input, then determining a response resulting from the expected control input, determining a compensated control input based on the expected control input and the response, and inputting the compensated control input to the second computer to achieve the expected control input.

The expected control input may include changes of one or more physical parameters over time.

The expected control input may include at least one of a curve and a step pulse.

The expected control input may include changes of at least one of a speed, an acceleration, an angle, and a location, a temperature, and a pressure over time.

The method may further include iteratively determining a second compensated control input based on the compensated control input and a response resulting from the compensated control input.

The method may further include determining a first set of expected operation points based on the expected control input and a predetermined sampling rate, determining a second set of response operation points based on the determined response and the predetermined sampling rate, and determining the compensated control input based on the first set of the expected operation points and the second set of response operation points.

The method may further include stopping determining a second compensated control input upon determining that a deviation between the response and the expected control input is less than a predetermined deviation threshold.

The deviation between the response and the expected control input may further include a plurality of deviations between a first set of expected operation points and a second set of response operation points.

The predetermined deviation threshold may include at least one of a maximum overshoot threshold, a maximum undershoot threshold, and an average threshold, of the plurality of deviations.

Further disclosed is a computing device programmed to execute the any of the above method steps. Yet further disclosed is an aerial drone comprising the computing device. Yet further disclosed is a vehicle comprising the computing device.

Yet further disclosed is a computer program product comprising a computer readable medium storing instructions executable by a computer processor, to execute the any of the above method steps.

Exemplary System Elements

FIG. 1 illustrates a vehicle 100. The vehicle 100 may be powered in a variety of known ways, e.g., with an electric motor and/or internal combustion engine. The vehicle 100 may be a land vehicle such as a car, truck, etc. A vehicle 100 may include a computer 110, actuator(s) 120, sensor(s) 130, and a human machine interface (HMI) 140.

The computer 110 includes a processor and a memory such as are known. The memory includes one or more forms of computer-readable media, and stores instructions executable by the computer 110 for performing various operations, including as discussed herein.

The computer 110 may operate the respective vehicle 100 in an autonomous or a semi-autonomous mode. For purposes of this disclosure, an autonomous mode is defined as one in which each of vehicle 100 propulsion, braking, and steering are controlled by the computer 110; in a semi-autonomous mode the computer 110 controls one or two of vehicle 100 propulsion, braking, and steering.

The computer 110 may include programming to operate one or more of land vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle 100 communications bus as described further below, more than one processor, e.g., controllers or the like included in the vehicle for monitoring and/or controlling various vehicle controllers, e.g., a powertrain controller, a brake controller, a steering controller, etc. A controller in the context of this disclosure is discussed below concerning FIG. 2. The computer 110 is generally arranged for communications on a vehicle communication network that can include a bus in the vehicle such as a controller area network (CAN) or the like, and/or other wired and/or wireless mechanisms.

Via the vehicle 100 network, the computer 110 may transmit messages to various devices in the vehicle 100 and/or receive messages from the various devices, e.g., an actuator 120, a sensor 130, an HMI 140, etc. Alternatively or additionally, in cases where the computer 110 actually comprises multiple devices, the vehicle 100 communication network may be used for communications between devices represented as the computer 110 in this disclosure. Further, as mentioned below, various controllers and/or sensors may provide data to the computer 110 via the vehicle communication network.

The actuators 120 can actuate various vehicle subsystems in accordance with appropriate control signals and typically include circuits, chips, and/or other electronic components. For instance, the actuators 120 may include one or more relays, servomotors, etc. The actuators 120, therefore, may be used to control braking, acceleration, and steering of the vehicle 100. The control signals used to control the actuators 120 may be generated by the computer 110, a controller, a control unit located in the vehicle 100, e.g., an electronic control unit (ECU) such as a brake controller, etc. The vehicle 100 may include various components or sub-systems, each including one or more sensors 130, actuators 120, controllers, etc. For example, the vehicle 100 may include a brake component including brake sensors 130, brake actuators 120, and/or other electronic, mechanical, etc. elements that stop the vehicle 100 based on commands received from a controller such as the computer 110. As another example, the vehicle 100 may include a powertrain component or sub-system that may include one or more actuators 120, sensors 130, etc., in addition to an engine, electric motor, and/or a transmission.

The sensors 130 may include a variety of devices to provide data to the computer 110. For example, the sensors 130 may include Light Detection And Ranging (LIDAR) sensor(s) 130, camera sensors 130, radar sensors 130, temperature sensor 130, pressure sensors 130, etc. disposed in and/or on the vehicle 100 that provide relative locations, sizes, shapes of other objects such as other vehicles, and/or any other physical parameter such as pressure, temperature, etc. As another example, the vehicle 100 may include angle and/or torque sensors 130 that provide angle and/or torque data from sensors 130 connected to various components of the steering system 150.

The HMI 140 may be configured to receive user input, e.g., during operation of the vehicle 100. As one example, an HMI 140 may include touchscreens, buttons, knobs, keypads, microphone, and so on for receiving information from a user. Moreover, an HMI 140 may include various interfaces such as a touchscreen display, a smart phone, etc., for receiving information from a user and/or outputting information to the user.

Figure 2:
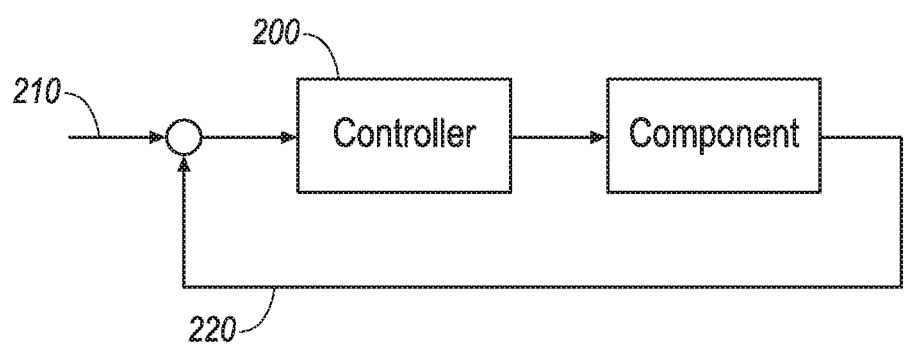
FIG. 2 is a block diagram showing a controller and a component.

With reference to FIG. 2, a controller 200 in the context of this disclosure is an electronic control unit (ECU) or other computing device, i.e., including a processor and a memory that can store instructions executable by the processor. A controller can be configured, e.g., by implementing hardware, firmware, and/or software, to control one or more physical parameters based on an expected control input 210. A controller 200 may include a processor, e.g., included in the vehicle 100 computer 110, that is programmed according to a control strategy, e.g., proportional integral derivative (PID), state space, etc. A PID controller 200 may include calibration parameter(s) such as one or more of a proportional, integral, and/or derivative parameter(s). Additionally or alternatively, a controller 200 may include an electronic circuit, e.g., an application-specific integrated circuit (ASIC), etc., configured to control a vehicle 100 operation. Additionally or alternatively, a computer such as the computer 110 may be programmed to control one or more physical parameter(s) based on an expected control input 210.

A control input 210 (or reference input, stimuli, reference value, etc.), in the present context, is a set of data describing physical parameters (i.e., values measuring physical phenomena related to vehicle 100 operation) such as a speed, heading (i.e., direction of travel), temperature, pressure, etc. over time. A control input 210 thus includes data describing a change of one or more physical parameters versus time. A physical parameter, i.e., a measurement of a physical phenomenon that describe a motion such as speed, angle, location, etc., and/or a change of any non-motion physical parameter such as temperature, pressure, etc. A control input 210 may include any combination of gradual changes, e.g., a curve, and/or a discontinuous or abrupt change, e.g., a step pulse, of a physical parameter. A control input 210 may include changes of one physical parameter over time, e.g., describing changes of a vehicle 100 speed versus time. Alternatively, a control input 210 may include changes of multiple physical parameters over time, e.g., describing changes of longitudinal and lateral acceleration of a vehicle 100 during a lane change maneuver over time. In other words, a control input 210 may describe changes of each of the longitudinal and lateral accelerations of the vehicle 100 over time. In another example, a control input 210 may include changes of pressure and temperature of a medium, e.g., a gas, in a container over time. In the present disclosure, a control input 210 describing changes of one physical parameter over time may be referred to a "single-variable" control input 210, whereas a control input 210 describing changes of multiple physical parameters over time may be referred to as a "multi-variable" control input 210. A control input 210 may be predetermined and stored in a memory of a vehicle 100 computer, e.g., in form of a table or array. For example, values in a table of possible control inputs, i.e., sets of physical parameters could be empirically determined for various conditions, e.g., changing lanes on a straight road at a specified speed, braking to a stop on dry pavement starting from a specified speed, just to name two of many possible examples. As another example, a control input 210 may be received as an input (including a table, array, etc.) from, e.g., a vehicle 101 computer 105, the vehicle 100 HMI 140, etc.

Figure 3:
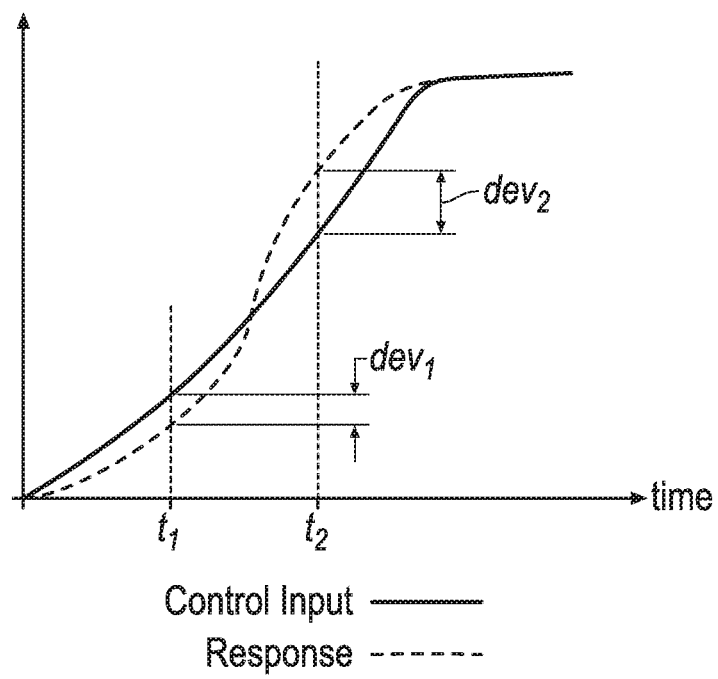
FIG. 3 is a graph of an expected control input and a response of the controller of FIG. 2.

A control input 210 may include a plurality of operation points. A number of operation points included in a control input 210 may be based on a duration of the control input 210, e.g., 3 seconds, and a sampling rate, e.g., 100 milliseconds (ms). An "operation point" specifies a value of one or more physical parameter(s) at a specific time. The specific time of each operation point refers to an associated sampling point, i.e., a time at which the value is defined or captured. Thus, in this example, the control input 210 includes 30 operation points. In one example, each operation point of a single-variable control input 210 may specify, e.g., a vehicle 100 speed, at a given time, whereas each operation point of a multi-parameter control input 210 may specify changes of multiple physical parameters, e.g., a longitudinal and a lateral acceleration, at a given time. FIG. 3 shows a graph including an example control input 210. Values of control input 210 at times $t_1$, $t_2$ represent two example operation points of the control input 210. For example, the Y-axis of the graph may illustrate an expected location, speed, acceleration, etc. of the vehicle 100.

A plurality of "actual" operation points describing physical parameters that occur in response to actuation of a controller 200 is referred to as a response 220. In this disclosure, the term "actual" is used in contrast with "expected." An expected operation point specifies what was expected (i.e., planned or desired) at a specific time, whereas the "actual" operation point specifies what was achieved at the specific time by actuating, e.g., one or more actuators 120 based on the expected operation points and control strategies. A control strategy in the present context includes a mathematical technique, e.g., PID (proportional integral derivative), to determine an actuation of an actuator 120 to follow an expected control input value. The response 220 may include changes of a physical parameter based at least in part on an actuation of a vehicle component by the controller 200, which is configured to actuate the vehicle component based at least in part on a control input 210. The controller 200 may include, e.g., stored in a computer memory, one or more calibration parameters that are adjusted to allow the controller 200 to follow an expected control input 210, i.e., resulting in response 220 that follows the expected control input 210. In a theoretical ideal situation, "follow" means that the response 220 of the controller 200 is identical to the expected control input 210. However, in reality, for various reasons such as an inaccurate calibration parameter, the response 220 of the controller 200 may deviate from the expected control input 210. An inaccurate calibration parameter is one where the respective parameter is not adjusted (or calibrated) such that the response 220 follows the expected control input 210. In some examples, an inaccurate calibration parameter may be non-calibratable, i.e., the calibration parameter is not changeable, e.g., because of a lack of access to overwriting a memory chip which stores the calibration parameter.

The graph of FIG. 3 shows an example response 220 to the control input 210. A difference between the response 220 and the expected control input 210 is in the present context referred to as a "deviation." For example, FIG. 3 shows deviations $dev_1$, $dev_2$ of the response 220 from the control input 210 at the times $t_1$, $t_2$. A deviation may be caused either when the response 220 exceeds the control input 210 which may be referred to as an "overshoot", or when the response 220 goes below the expected control input 210, which may be referred to as an "undershoot." As discussed above, a control input 210 includes a plurality of operation points. Thus, the expected control input 210 may include a first set of expected operation points and the response 220 may include a second set of response 220 operation points. The deviation may include a plurality of deviations between each of the respective operation points of the first and second set. In other words, a deviation of a single variable control input 210 includes a difference between values of the physical parameter of expected versus response 220 operation points at a given point in time. A deviation of a multi-variable control input 210 of, e.g., the longitudinal and lateral acceleration, includes differences between expected versus response longitudinal acceleration, and expected and versus response lateral acceleration at a given time. A deviation may be specified as a percentage determined by dividing a deviation value by an expected value at an operation point. A deviation threshold may include a threshold concerning a maximum, an average, etc. of the respective plurality of deviations. In one example, a response 220 may be considered as "calibrated" to follow the expected control input 210 when a maximum of deviation is less than 5%. In other words, a deviation between each of the operation points of the expected control input 210 and the response 220 is less than 5%.

A controller 200 may be considered to be inaccurately calibrated when a deviation of the response 220 exceeds a predetermined threshold. A predetermined deviation threshold may include a maximum overshoot threshold, a maximum undershoot threshold, and an average threshold of deviations. For example, a maximum overshoot threshold may be 110% (i.e., 10% above control input value), a maximum undershoot threshold may be 95% (i.e., 5% below control input value), and an average deviation threshold may be +/−3% (i.e., an average response value is expected to be between 97% to 103% of control input value).

Figure 4:
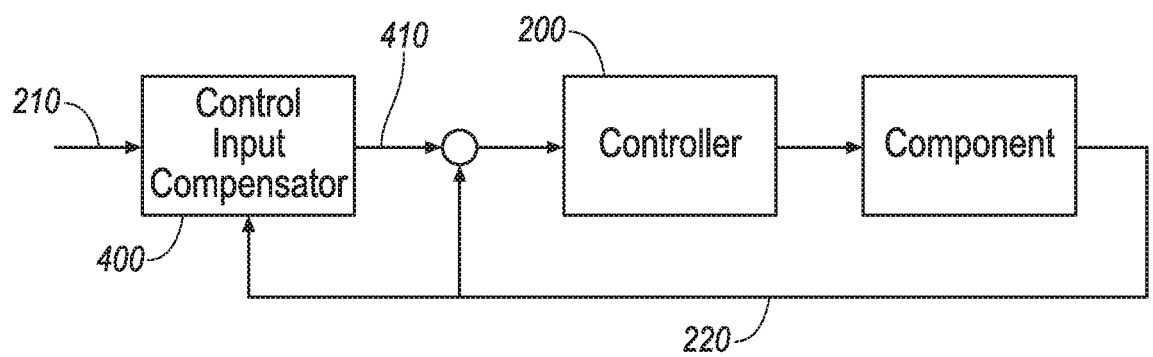
FIG. 4 is a block diagram showing a control input compensator that compensates the expected control input prior to inputting to the controller.

With reference to FIG. 4, the computer 110 can be programmed to provide an expected control input 210 to a controller 200. The controller 200 may be configured to actuate a vehicle component to achieve the expected control input 210. The computer 110 can be further programmed to then determine a response 220 resulting from the expected control input 210, and to determine a compensated control input 210 based on the expected control input 210 and the response 220. The computer 110 can be further programmed to input the compensated control input 210 to the controller 200 to achieve the expected control input 210.

In one example shown in FIG. 4, the vehicle 100 may include a control input compensator 400 that may be implemented as hardware and/or software, e.g., programming of the computer 110. The control input compensator 400 may receive the control input 210 and the response 220, and may output the compensated control input 410. In other words, the control input compensator 400 may output the compensated control input 410 based on the control input 210 and the response 220. As discussed below with reference to FIG. 5, the control input compensator 400 may be configured to determine the compensated control input 410 such that the deviation between the response 220 and the control input 210 is below the predetermined deviation threshold. In one example, the compensated control input 410 may be communicated to the controller 200 via a vehicle 100 communication network such as Ethernet, Controller Area Network (CAN), etc. Thus, the control input compensator 400 and the controller 200 are physically distinct hardware components.

Figure 5:
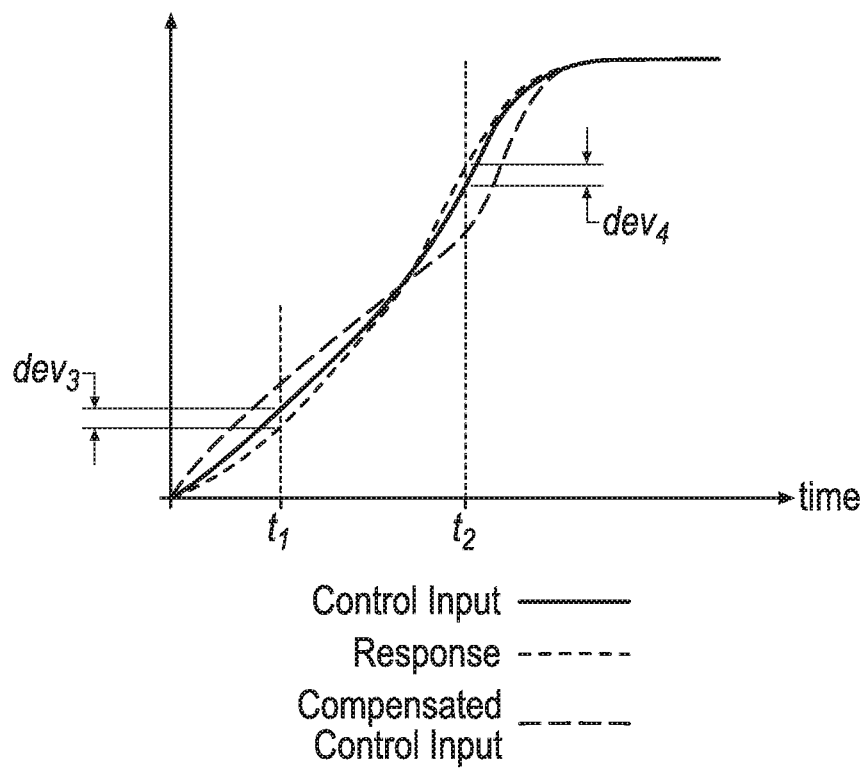
FIG. 5 is a graph showing the compensated control input and a response of the controller to the compensated control input.

FIG. 5 shows a graph including the control input 210, the compensated control input 410, and the response 220 in result of the compensated control input 410. The compensated control input 410 may result in a reduction of the deviations. For example, FIG. 5 shows deviations $dev_3$, $dev_4$ of the response 220 from the control input 210. As a result of inputting the compensated control input 410 to the controller 200 instead of the control input 210, the deviation $dev_3$ and/or the deviation $dev_4$ at the times $t_1$, $t_2$ may be less than the deviations $dev_1$, $dev_2$.

As shown in FIG. 4, the control input compensator 400 receives the response 220 as an input. Thus, the control input compensator 400 may be programmed to determine a change of deviations as a result of compensating the control input 210. In one example, the computer 110 may be programmed to iteratively determine a second compensated control input 210 based on the compensated control input 210 and a response 220 resulting from the compensated control input 210. In other words, in an iterative process as discussed below concerning Tables 3-4, the computer 110 may be programmed to compensate an already compensated control input 410 to further reduce the deviation of the response 220 relative to the compensated control input 410. The computer 110 may be programmed to stop determining a second compensated control input 210 upon determining that a deviation between the response 220 and the expected control input 210 is less than a predetermined deviation threshold.

TABLE 1

| | $OP_1$ | $OP_2$ | $OP_3$ | $OP_4$ | $OP_5$ | $OP_6$ | $OP_7$ |
|---|---|---|---|---|---|---|---|
| Control Input | 0.099 | 0.3765 | 0.7775 | 1.2225 | 1.6235 | 1.901 | 2 |
| Response | 0.059 | 0.343 | 0.7397 | 1.201 | 1.6207 | 1.9207 | 2.0398 |

With reference to Table 1, the computer 110 may be programmed to determine a first set of expected operation points, e.g., control input operation points $OP_1$ to $OP_7$ (see the row of Table 1 labeled "control input"), based on the expected control input 210 and a predetermined sampling rate, e.g., 1 sample per 100 milliseconds (ms), to determine a second set of response 220 operation points, e.g., response operation points $OP_1$ to $OP_7$ (see the row of Table 1 labeled "response"), based on the determined response 220 and the predetermined sampling rate, and to determine the compensated control input 210 based on the first set of the expected operation points and the second set of response 220 operation points. The values in Table 1 are physical parameters; in an example, a vehicle 100 lateral location relative to a vehicle 100 lane center specified in meters (m), but many other physical parameters are possible. Herein below various techniques are discussed to determine the compensated control input 410.

TABLE 2

| | Iteration | | | |
|---|---|---|---|---|
| | 1 | 2 | 11 | 12 |
| Compensated control input | 0.09903 | 0.10003 | ... | 0.10748 | 0.10748 |
| | 0.37651 | 0.38028 | ... | 0.40202 | 0.40202 |
| | 0.77748 | 0.78526 | ... | 0.80731 | 0.80694 |
| | 1.22252 | 1.23474 | ... | 1.24618 | 1.24677 |
| | 1.62349 | 1.62629 | ... | 1.6387 | 1.63848 |
| | 1.90097 | 1.88196 | ... | 1.89881 | 1.89885 |
| | 2 | 1.98 | ... | 1.98143 | 1.98137 |
| Response | 0.05896 | 0.09218 | ... | 0.09904 | 0.09904 |
| | 0.34297 | 0.35606 | ... | 0.37651 | 0.37651 |
| | 0.73971 | 0.75541 | ... | 0.77773 | 0.77739 |
| | 1.20102 | 1.20896 | ... | 1.22207 | 1.22258 |
| | 1.62069 | 1.61133 | ... | 1.62368 | 1.62347 |
| | 1.92069 | 1.88475 | ... | 1.90097 | 1.90111 |
| | 2.03983 | 1.99705 | ... | 2.00009 | 1.9999 |

TABLE 3

| | Column 1 | Column 2 | Column 3 | Column 4 | Column 5 | Column 6 | Column 7 |
|---|---|---|---|---|---|---|---|
| Row 1 | 33.1881 | 0 | 0 | 0 | 0 | 0 | 0 |
| Row 2 | 1.55841 | 3.06153 | 0 | 0 | 0 | 0 | 0 |
| Row 3 | 0.24899 | 0.48914 | 1.75006 | 0 | 0 | 0 | 0 |
| Row 4 | 0.01701 | 0.03342 | 0.11958 | 0.56214 | 0 | 0 | 0 |
| Row 5 | −0.0027 | −0.0053 | −0.019 | −0.0895 | −2.8903 | 0 | 0 |
| Row 6 | −0.0014 | −0.0028 | −0.0099 | −0.0466 | −1.5027 | 1.63449 | 0 |
| Row 7 | −0.0002 | −0.0004 | −0.0016 | −0.0075 | −0.2421 | 0.26332 | 1.8495 |

In one example shown in Tables 2-3, the control input compensator 400 may be configured (i.e., programmed as software and/or implemented in hardware) to determine the compensated control inputs 410 using Jacobian matrix calculation technique. A Jacobian matrix is a matrix of all first-order partial derivatives of a vector-valued function. Column 1 of Table 2 show the operation points $OP_1$ to $OP_7$ of the expected control input 210 and the associated operation points of the response (i.e., when the control input compensator 400 does not apply any compensation to the expected control input 210 to determine the response to the expected control input 210, as shown in the row labeled "response" in Table 1). The columns 2 through 12 of Table 2 show the compensated control inputs 410. The control input compensator 400 may be configured to iteratively determine a compensated control input 410, e.g., column 5, based on the determined response to the previous compensated control input, e.g., column 4 (not shown).

Based on operation (1) a Jacobian matrix can be calculated which provides a relationship between a change of response dY and a change of control input dU. dU and dY represent matrix subtraction operations, i.e., each element of each array is subtracted from a corresponding element of another array. For example, dU may include a subtraction of the compensated control input of column 3 from the compensated control input of column 4. Therefore, dimensions of dU and dY are based on a number of operation points, e.g., 7 in the example of Table 1.

$$(1)\ dY = Jac * dU = \begin{bmatrix} Jac_1 \\ \vdots \\ Jac_m \\ \vdots \\ Jac_7 \end{bmatrix} * dU,$$

where $Jac_m = [\ K_{m1}\ \ldots\ K_{m,n}\ \ldots\ K_{m,7}\ ]$ $$(2)\ K_{mn} = \frac{R(n)}{\sum_{n=1}^{m} R(n)} * \frac{dY(m)}{dU(n)}$$

Operation (2) defines how the elements of the Jacobian matrix Jac are determined. The parameter n represents a number of iterations. For example, based on Table 2, m (number of iterations) can be any number between 1 and 12. Table 3 shows an example Jac matrix for the first iteration. The compensated control input 410 can be calculated based on $Jac^{-1}$ (inverse of matrix Jac) as shown in operation (3). Operation (3) defines a relationship between a compensated control input $I_C$ and a expected control input $I_P$. The parameter m represents a number of operation points. For example, $I_C$ may be the compensated control input of column 12 calculated determined based on control input $I_P$ of column 11. In other words, because the compensation is an iterative process, the expected control input $I_E$ may be also a compensated control input.

$$I_C(t(0,1,\ldots,m)) = Jac^{-1} * I_E(t(0,1,\ldots,m)) \quad (3)$$

With reference to Table 2, the control input compensator 400 may be configured to stop determining a second compensated control input (i.e., to stop the iterative process) upon determining that the deviation of the response, e.g., response shown in column 12, is less than the predetermined deviation threshold. For example, with reference to column "12" of Table 2, the control input compensator 400 stops determining a next compensated control input upon determining that the deviation of response in column "12" relative to the control input of column "1" of Table 2 is less than the predetermined deviation threshold, e.g., 0.005.

As discussed above, the technique discussed above, which may be referred to as the first technique, includes matrix calculation and inversion. As another example technique, the first method may be simplified to a second technique that includes calculating of compensated control input 410 based on scalar calculations, i.e., by focusing on the diagonal terms of the Jacobian. Focusing on diagonal terms means the operation points of the compensated control input at an operation point $OP_x$ is based on values of response and expected control input at the operation point $OP_x$ (and not based on response to any other operation point, e.g., $OP_{x-1}$, $OP_{x+1}$, etc.) The control input compensator 400 may be configured to determine the compensated control input based on operations (4) and (5). Thus, the compensated control input $I_C$ is determined based on the K which is calculated based on operation (4). Y represents the response to the control input. The operation "./" is a dot-division which includes dividing a change in the response by a change in the expected control input. Thus, a change in a response at a given operation point is divided by the change in control input at the same operation point. In an iterative process, similar to the technique above, $I_E$ may represent a result of the last compensated control input. In other words, the $I_c$ of column 4 may be determined based on K calculated based on a change of response and a change of control input of columns 3 compared to column 2.

$$K = Y(t(0,1,\ldots,m))./I_C(t(0,1,\ldots,m)) \quad (4)$$

$$I_C(t(0,1,\ldots,m)) = I_E(t(0,1,\ldots,m))./K \quad (5)$$

TABLE 4

| | Iteration | | | |
|---|---|---|---|---|
| | 1 | 2 | 12 | 13 |
| Compensated control input | 0.099033 | 0.110036 | ... 0.071537 | 0.070022 |
| | 0.376511 | 0.413335 | ... 0.39232 | 0.39232 |
| | 0.777479 | 0.817174 | ... 0.761895 | 0.761895 |
| | 1.222521 | 1.244411 | ... 1.202874 | 1.202874 |
| | 1.623489 | 1.626296 | ... 1.617709 | 1.617709 |
| | 1.900967 | 1.881448 | ... 1.907983 | 1.907983 |
| | 2 | 1.96095 | ... 1.992062 | 1.992062 |
| Response | 0.058956 | 0.133407 | ... 0.100284 | 0.099072 |
| | 0.342968 | 0.40106 | ... 0.375678 | 0.375515 |
| | 0.739712 | 0.827429 | ... 0.77564 | 0.7755 |
| | 1.201016 | 1.261113 | ... 1.225819 | 1.225949 |
| | 1.620687 | 1.634812 | ... 1.623515 | 1.623429 |
| | 1.920689 | 1.874654 | ... 1.898694 | 1.898751 |
| | 2.039827 | 1.969772 | ... 1.999364 | 1.999339 |
| Jacobian | 0.595324 | 7.4994 | ... 0.416658 | 0.406156 |
| | 0.910911 | 1.427891 | ... 0.665626 | 0.665626 |
| | 0.951424 | 1.835035 | ... 0.799292 | 0.799292 |
| | 0.982409 | 2.206043 | ... 0.701995 | 0.701995 |
| | 0.998274 | 4.011814 | ... 1.068189 | 1.068189 |
| | 1.010374 | 1.874152 | ... 0.866376 | 0.866376 |
| | 1.019914 | 1.400877 | ... 1.016777 | 1.016777 |

Table 4 shows an example of compensating control inputs based on the second technique. Because of the focus on diagonal terms, Jacobian matrices of the second method can be shown in the same column as the iterations are shown. In other words, for each operation point of control input and response, an associated value is calculated in the Jacobian. Therefore, a number of values in the Jacobian matrix using the second technique is equal to the number of operation points, i.e., the Jacobian matric is an array in the second technique instead of a matrix as discussed concerning the first technique. As one example, a low pass filter is applied to the Jacobians determined in Table 4, e.g., to prevent an outlier affecting the compensation of control input.

Table 5 shows a comparison of deviations based on the first technique and the second technique. The compared results in Table 5 are from the last iteration of compensating the control input using the first technique (see iteration 12 in Table 2) and the last iteration of compensating the control input using the second technique (see iteration 13 in Table 4). As shown in Table 5, the first method may provide compensated control inputs that cause a lower deviation compared to the response to the control input compensated using the second method, whereas the second method may include less number of calculation steps because of including scalar calculations instead of matrix calculations as discussed concerning the first method.

TABLE 5

| Operation Point | Control Input | First Deviation | Second Deviation |
|---|---|---|---|
| OP1 | 0.0990325 | −1.04E−05 | −3.895E−05 |
| OP2 | 0.3765114 | −8.014E−07 | 0.00099603 |
| OP3 | 0.7774793 | 9.192E−05 | 0.00197944 |
| OP4 | 1.2225207 | −6.349E−05 | −0.0034283 |
| OP5 | 1.6234886 | 2.1664E−05 | 5.982E−05 |
| OP6 | 1.9009675 | −0.0001394 | 0.00221669 |
| OP7 | 2 | 9.5019E−05 | 0.00066071 |

Processing

Figure 6:
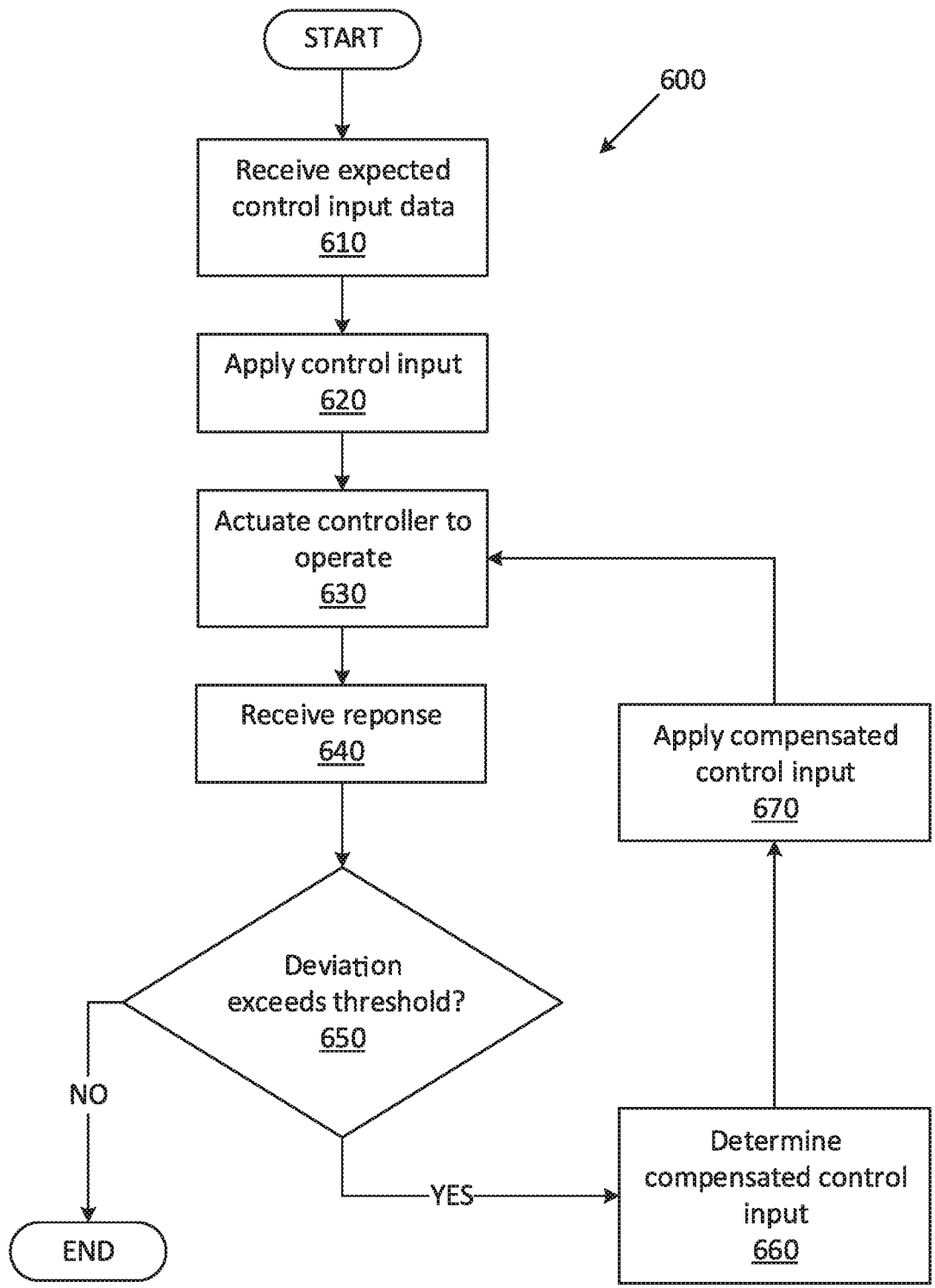
FIG. 6 is a flowchart of an exemplary process for compensating the expected control input and operating the vehicle.

FIG. 6 is a flowchart of an exemplary process 600 for compensating the expected control input and operating the vehicle 100. For example, the control input compensator 400 may be configured, e.g., implemented in hardware and/or programmed in software, to execute blocks of the process 600.

The process 600 begins in a block 610, in which the control input compensator 400 receives control input 210 data. For example, the control input compensator 400 may receive the control input 210 data via the vehicle 100 communication network, a memory of the control input compensator 400, etc.

Next, in a block 620, the control input compensator 400 applies the control input 210 data to the controller 200, e.g., via the vehicle 100 communication network.

Next, in a block 630, the control input compensator 400 actuates the controller 200 to operate. In one example, the control input compensator 400 actuates the controller 200 via a message sent via the vehicle 100 communication network, an activation electrical signal sent via an electrical wiring between the compensator 400 and the controller 200, etc. Additionally or alternatively, the controller 200 may be configured to operate permanently based on the received control input from the compensator 400.

Next, in a block 640, the control input compensator 400 receives a response 220. For example, the control input compensator 400 may be configured to receive the response 220 via the vehicle 100 communication network, sensor inputs included in the control input compensator 400, etc.

Next, in a decision block 650, the control input compensator 400 determines whether a deviation between the expected control input and the response exceeds a deviation threshold, e.g., 3%. If the control input compensator 400 determines that the deviation exceeds the deviation threshold, then the process 600 proceeds to a block 660; otherwise the process 600 ends; or alternatively returns to the block 630.

In the block 660, the control input compensator 400 determines a compensated control input 410. For example, the control input compensator 400 determines the compensated control input 410 based on the expected control input 210 and the response received based on applying the expected control input. Additionally or alternatively, e.g., when the previously applied control input was a compensated control input 210, the control input compensator 400 may be configured to determine a second compensated control input 410 based on the received expected control input and the response based on applying the compensated control input 410. In other words, in an iterative process of compensating the control input, the compensator 400 determines a new compensated control input 410 based on the expected control input 210 and a last applied compensated control input 410.

Next, in a block 670, the control input compensator 400 applies the determined compensated control input (or the second compensated control input 410) to the controller 200, e.g., via the vehicle 100 communication network. Following the block 670, the process 600 proceeds to the block 630.

Thus, advantageously, without modifying controller 200 software programming and/or controller 200 calibration parameters, the control input 210 may be compensated to achieve a response with a deviation from the expected control input that is less than the deviation threshold.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a first computer that includes a processor and a memory, the memory storing instructions executable by the processor to:
    input an expected control input to a second computer, wherein the second computer is provided to actuate a vehicle component to achieve the expected control input;
    then determine a response resulting from the expected control input;
    determine a deviation between the response and the expected control input, the deviation selected to indicate that an unmodifiable control parameter stored in the second computer is uncalibrated;
    determine a compensated control input based on the deviation; and
    input the compensated control input to the second computer to achieve the expected control input to compensate for an inaccuracy of the unmodifiable parameter.

2. The system of claim 1, wherein the expected control input includes changes of one or more physical parameters over time.

3. The system of claim 1, wherein the expected control input includes at least one of a curve and a step pulse.

4. The system of claim 1, wherein the expected control input includes changes of at least one of a speed, an acceleration, an angle, and a location, a temperature, and a pressure over time.

5. The system of claim 1, wherein a parameter of the second computer is non-calibratable.

6. The system of claim 1, wherein the instructions include further instructions to iteratively determine a second compensated control input based on the compensated control input and a response resulting from the compensated control input.

7. The system of claim 1, wherein the response includes changes of a physical parameter based at least in part on an actuation of the vehicle component by the second computer, wherein the second computer is configured to actuate the vehicle component based at least in part on the control input.

8. The system of claim 1, wherein the instructions include further instructions to:
    determine a first set of expected operation points based on the expected control input and a predetermined sampling rate;
    determine a second set of response operation points based on the determined response and the predetermined sampling rate; and
    determine the compensated control input based on the first set of the expected operation points and the second set of response operation points.

9. The system of claim 1, wherein the instructions include further instructions to stop determining a second compensated control input upon determining that the deviation between the response and the expected control input is less than a predetermined deviation threshold.

10. The system of claim 9, wherein the deviation between the response and the expected control input further includes a plurality of deviations between a first set of expected operation points and a second set of response operation points.

11. The system of claim 10, wherein the predetermined deviation threshold includes at least one of a maximum overshoot threshold, a maximum undershoot threshold, and an average threshold, of the plurality of deviations.

12. A method, comprising:
    inputting, from a first computer, an expected control input to a second computer, wherein the second computer is provided to actuate a vehicle component to achieve the expected control input;
    then determining a response resulting from the expected control input;
    determining a deviation between the response and the expected control input, the deviation selected to indicate that an unmodifiable control parameter stored in the second computer is uncalibrated;
    determining a compensated control input based on the deviation; and
    inputting the compensated control input to the second computer to achieve the expected control input to compensate for an inaccuracy of the unmodifiable parameter.

13. The method of claim 12, wherein the expected control input includes changes of one or more physical parameters over time.

14. The method of claim 12, wherein the expected control input includes at least one of a curve and a step pulse.

15. The method of claim 12, wherein the expected control input includes changes of at least one of a speed, an acceleration, an angle, and a location, a temperature, and a pressure over time.

16. The method of claim 12, further comprising iteratively determining a second compensated control input based on the compensated control input and a response resulting from the compensated control input.

17. The method of claim 12, further comprising:
    determining a first set of expected operation points based on the expected control input and a predetermined sampling rate;
    determining a second set of response operation points based on the determined response and the predetermined sampling rate; and
    determining the compensated control input based on the first set of the expected operation points and the second set of response operation points.

18. The method of claim 12, further comprising stopping determining a second compensated control input upon determining that the deviation between the response and the expected control input is less than a predetermined deviation threshold.

19. The method of claim 18, wherein the deviation between the response and the expected control input further includes a plurality of deviations between a first set of expected operation points and a second set of response operation points.

20. The method of claim 19, wherein the predetermined deviation threshold includes at least one of a maximum overshoot threshold, a maximum undershoot threshold, and an average threshold, of the plurality of deviations.

\* \* \* \* \*